Nov. 17, 1953  E. P. TYLER  2,659,296
BROILER
Filed Feb. 18, 1950  3 Sheets-Sheet 2

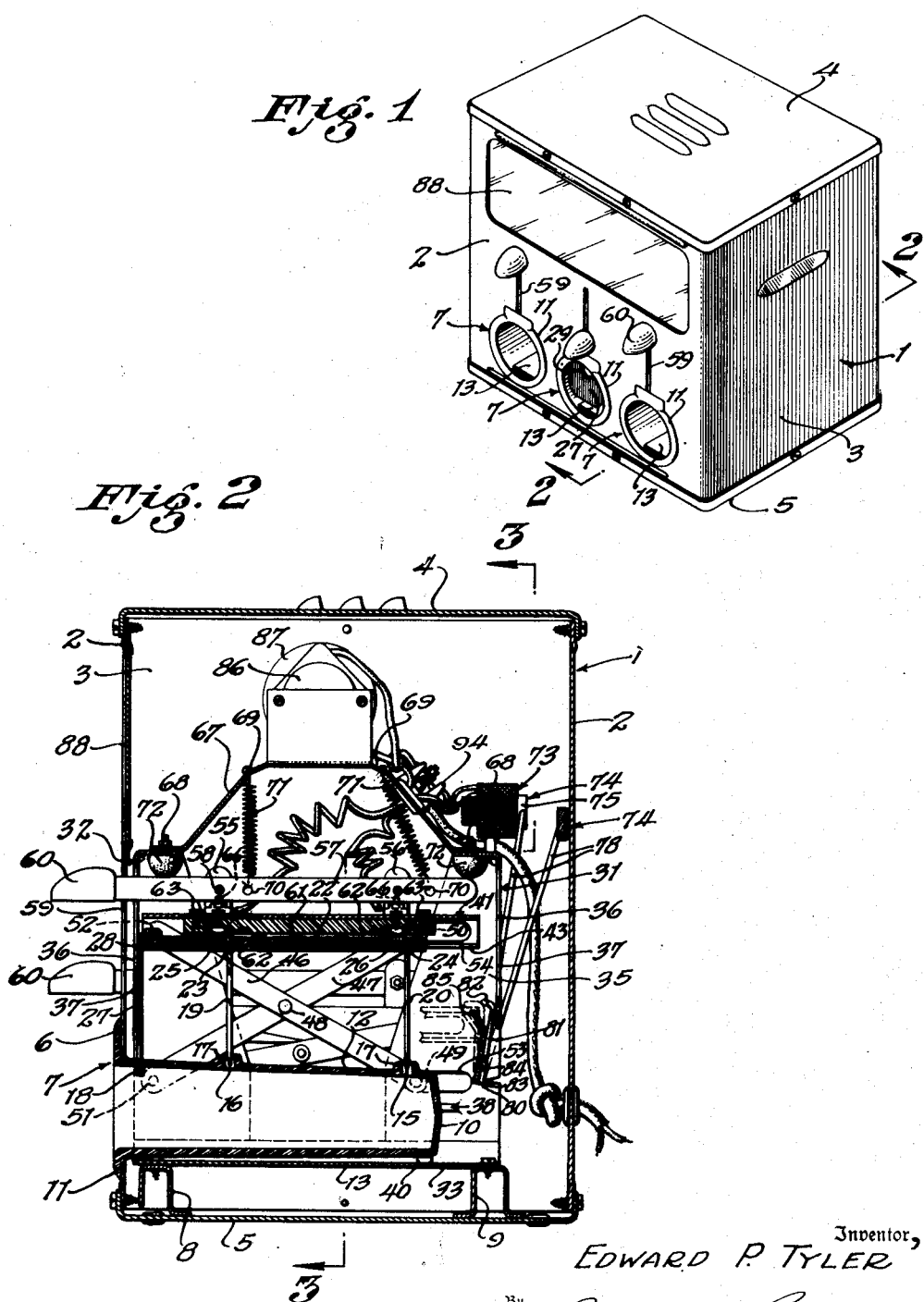

Inventor,
EDWARD P. TYLER
By Calvin Brown
Attorney

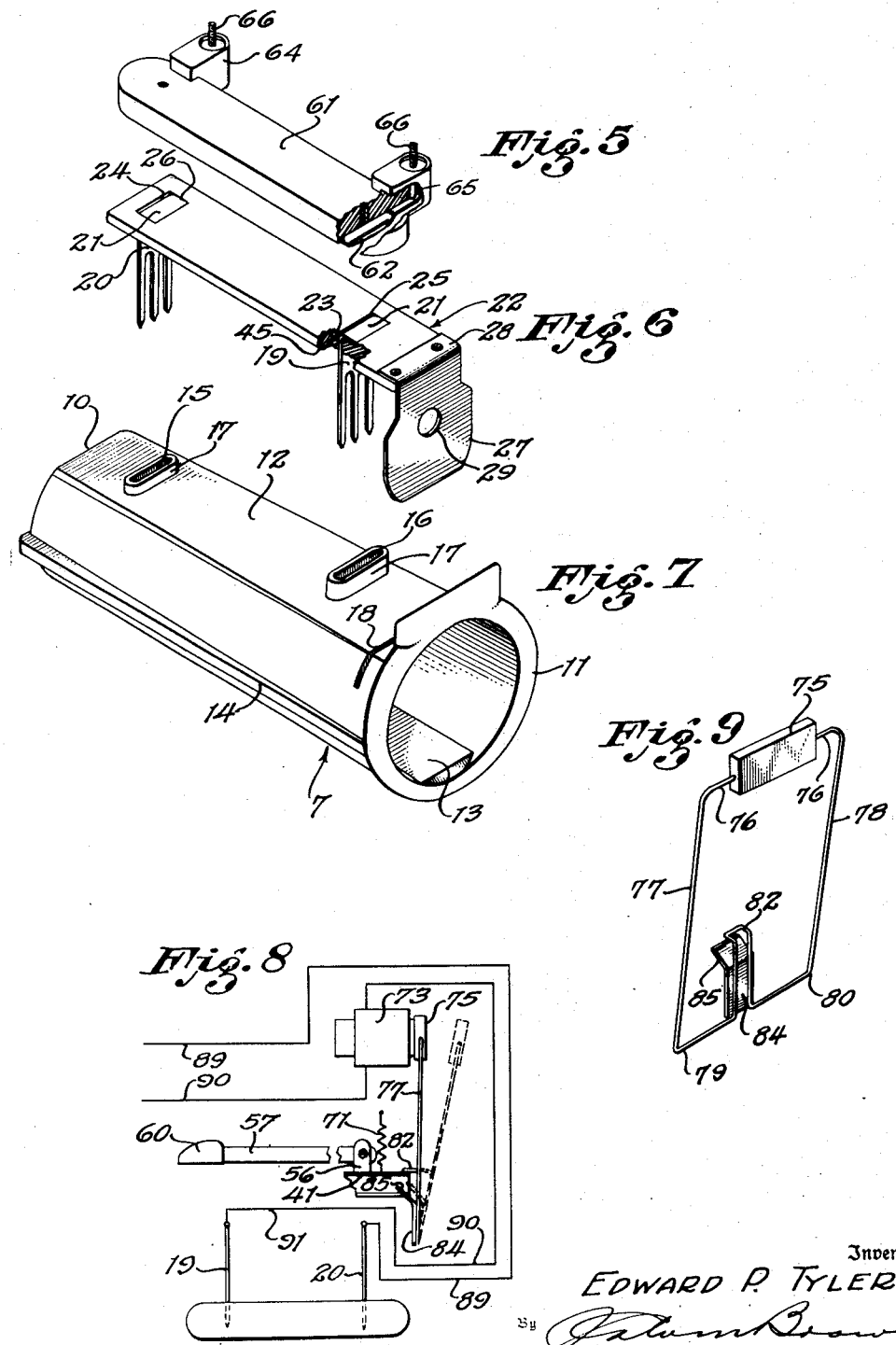

Patented Nov. 17, 1953

2,659,296

UNITED STATES PATENT OFFICE 2,659,296

BROILER

Edward P. Tyler, North Hollywood, Calif.

Application February 18, 1950, Serial No. 144,900

2 Claims. (Cl. 99—358)

This application contemplates a continuation-in-part of my application for Broilers, filed in the United States Patent Office December 15, 1947, Serial No. 791,682, and which has matured into Patent No. 2,550,889.

The present invention relates to broilers, and particularly to a type of broiler adapted to cook sandwiches such as the well-known "hot dog" or frankfurter sandwich. Sandwiches of this type usually have the frankfurter encased between two slices of a bun. It is common practice to first broil the frankfurter and then apply the same between the slices of the bun.

Such methods, however, are not sanitary, particularly when the stand is outside, on a beach, or by a roadway, where dirt and dust may contact the food. Furthermore, these so-called stands expose the buns to the dirt and dust and are handled by the hands.

The present invention contemplates a bun cut in half with a frankfurter placed therebetween, and the entirety then inserted within a wrapper which may be transparent, and which wrapper is sealed, with the result that the sandwich is maintained in a sanitary condition.

An object of the present invention is the provision of a broiler which has one or more magazines adapted to receive the sandwich encased within its wrapper, and which sandwich is heated by passing an electric current through the frankfurter.

The inventor is aware that it is not new in the art to pass an electric current through meat for the purpose of cooking the meat. However, the present invention contemplates a simple and economical means for timing the cooking of the meat so that proper cooking of said meat is at all times assured. In the use of the present invention, the meat is always properly broiled, and regardless of whether the meat originally, when inserted within the magazine to be cooked, is frozen or at room temperature.

A further object is the provision of a broiler which does not allow the food article, such as a frankfurter, to burn.

A further object is the provision of a broiler so arranged and constructed that the magazine or magazines adapted to hold the food article in its wrapper, together with the spits which penetrate the food article, are easily removed for cleaning, to the end that the device may always be maintained in a sanitary condition.

A further object is the provision in a broiler of means whereby penetration of the food article by the spits automatically locks the spits within the food article, and which spits are automatically released from the locked position when the food article is cooked.

A further object is the provision of a cooker which has eye appeal, economical in cost of construction, and superior to broilers for performing a like purpose now known to the inventor.

With the above mentioned and other objects in view, the invention consists in the novel and useful provision, formation, construction, association and arrangement of parts, members and features, all as depicted in a certain embodiment in the accompanying drawings, described generally, and more particularly pointed out in the claims.

In the drawings:

Figure 1 is a perspective view of the exterior of the broiler, showing its casing, magazines for receiving the food article, and handles for depressing spits for the purpose of cooking the food article;

Figure 2 is an enlarged transverse section on the line 2—2 of Figure 1;

Figure 5 is a fragmentary, perspective view of an element of the invention;

Figure 6 is a partially fragmentary perspective view of the spits-carrying member;

Figure 7 is a perspective view of a magazine for holding the food article to be cooked;

Figure 8 is a wiring diagram; and

Figure 9 is a perspective view of an armature forming part of the timing control of the invention.

Figure 3:
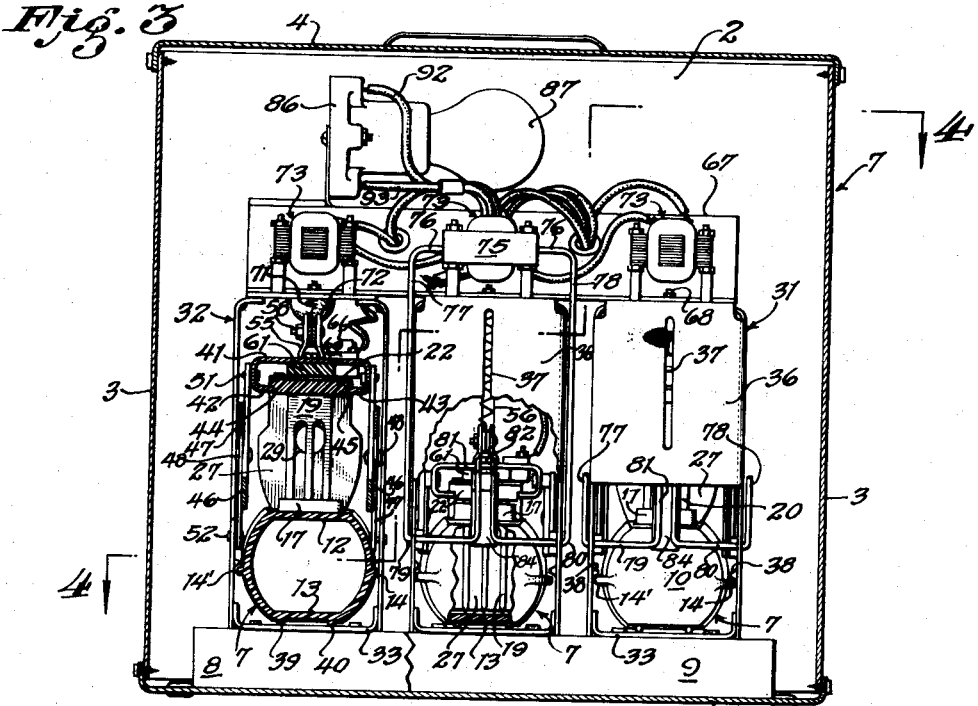
Figure 3 is a sectional view on the line 3—3 of Figure 2.

Referring now to the drawings, the broiler mechanism is placed within a casing, such as shown at 1. No particular type of casing is contemplated, although the casing should be of a type which permits disassembly thereof. The casing 1 has front and rear walls 2 and side walls 3, the top 4 and bottom 5 being held to the front and rear walls by means of screws. The front wall is provided with one or more aligned openings 6 adapted to receive magazines or compartments 7 which house the food articles. The base 5 is provided with a pair of spaced apart channel members 8 and 9 which support the broiler mechanism, as best illustrated in Figures 2 and 3. The broiler mechanism consists of a plurality of identically formed devices, each one of which is adapted to broil a food article. Hence, within the purview of the invention, any number of magazine-receiving openings may be provided in the front wall 2, the drawing showing three. As all of the broiler mechanisms are identical, one thereof will be described.

The magazine 7 comprises an elongated body, the wall of which tapers or is of conical form. The magazine is provided with a back wall 10, the front thereof being open and provided with a marginal flange 11. The body of the magazine is provided diametrically with top and bottom elongated flattened areas 12 and 13, and the curved side wall portion of the magazine is formed with diametrically disposed elongated flanges 14 and 14'. The flattened area 12 is formed with spaced transverse slots 15 and 16, the slots in each instance being surrounded by a wall or flange 17. Adjacent the marginal flange 11, the flat area 12, and a portion of the curved side wall, is a transverse slot 18.

The magazine is adapted to permit the insertion therein or removal therefrom of front and rear spits or tine members 19 and 20, each member of which is provided with an angularly disposed portion 21. The tine members are supported by an insulation plate 22 formed with front and rear transverse slots 23 and 24, the top surface of said plate being recessed at 25 and 26 adjacent the said slots 23 and 24 respectfully. The tine members are dropped through the slots 23 and 24 while the angularly disposed ends thereof are received within the recessed portions 25 and 26.

The said plate 22 carries at one end a guard plate 27, this guard plate having an angularly bent portion at 28 which is attached to the tine support plate. The front of said guard plate is provided with an opening 29. The tines are passed through the slots 15 and 16 of the magazine, and are guided in their movement by the encircling flanges 17, while the guard plate is passed through slot 18. This position is shown in Figure 1 at 30.

Figure 4:
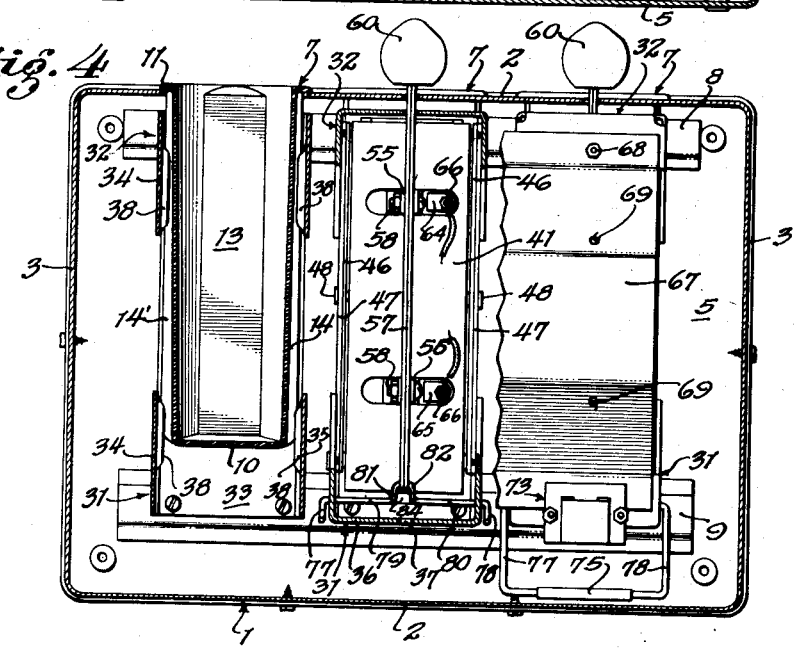
Figure 4 is a sectional view on the line 4—4 of Figure 3.

Adapted to be mounted between the members 8 and 9 are a pair of upright supports 31 and 32. These supports are joined by a flanged base plate 33. As best shown in Figures 2 and 4, the supports which are of identical form have spaced apart side walls 34 and 35, between which extends a wall 36 of lesser height than the height of the side walls, see Figure 3. The wall 36 is provided with an elongated slot 37. The side walls of the said supports are struck inwardly to provide spring members designated generally as 38 which spring members have rubbing engagement with the flanges 14 of a magazine when the magazine is received within the cabinet, see Figure 4. It will be observed on reference to Figure 4 that the side flanges 14 taper in width in order to compensate for the conical form of the magazine and provide parallel edges for engagement with the said springs 38. In this respect, the flattened wall 13 is externally provided with spaced flanges or elongated ribs 39 and 40 which taper in depth to compensate for the conical form of the magazine to the end that the magazine may move straight inwardly upon the surface of the plate 33.

I provide an elevator member 41 of channel plate form, the flanges of which are inwardly bent along each longitudinal edge to lie in the same plane, as shown at 42 and 43. The plate 22 is rabbeted along its longitudinal edges, as shown at 44 and 45, the rabbeted portions being received between the inwardly bent portions 42 and 43 and supported by said portions. The elevator plate is positioned between the supports 31 and 32. I provide a pair of levers for each side of the elevator plate, one of said pairs being shown in Figure 2 at 46 and 47. The two levers are pinned together intermediate their ends at 48, one end of each lever carrying a roller at 49 and 50. The opposite end of lever 46 is pinned to the side of one of the supports while the opposite end of lever 47 is pinned to the elevator plate, see Figure 3 at 51 and 52. The position of the pair of levers on the opposite side is identical to that just described for one of the pairs.

The rollers 49 and 50 are positioned within slots, one slot 53 being in a side of support 32, see Figure 2, while the other slot is within a side of the elevator plate at 54. The elevator plate is provided with front and rear clevis type clips 55 and 56, between which extends an arm 57, the arm being fastened to said clips in any suitable manner, such as by bolts 58, the arm is of a length sufficient to allow it to project through slot 37 and likewise through a slot 59 in the front wall of the casing. This arm carries a finger piece 60 which is positioned externally the casing. It is, of course, obvious that the lever system which interconnects the supports with the elevator plate allows the elevator to move straight upwardly or downwardly when the arm 57 is moved vertically upwardly and downwardly.

A plate 61 carries on one surface a pair of spaced spring contacts 62, the plate being recessed in the zone of the contacts, so as to preserve alignment thereof, and which plate is secured to the elevator plate, as shown in Figure 2 at 63. The spacing of the spring contacts is equal to the spacing of the angular ends 21 of the tine or fork members 19 and 20. Plate 61 is preferably formed of insulating material and carries a pair of lugs extending from one longitudinal edge of the plate, as shown at 64 and 65, Figure 5, these lugs having screws 66 passed therethrough for securing one end of the spring contacts and likewise acting as posts for the ends of wire leading to a source of electricity.

Adapted to span the front and rear supports 31 and 32 is a concavo-convex hood or chassis top 67. This top is fastened to the front and rear supports by screws or the like 68 and the hood may be perforated at one or more points 69, as is likewise the arm 57 at 70. Coil springs 71 have their ends passed through the openings 69 and 70 to thereby normally tend to elevate the arm 57 to the position in Figure 2, which raises the elevator plate, the insulation plate 61 with its contacts, the tine carrying plate 22 with its tine members, and associated guard plate, see Figure 3. As movement from the lowered position to the elevated position may be quite abrupt, bumpers 72 are provided which will engage the arm 57 in the elevated position.

A timing device is provided which includes an electromagnet or solenoid 73 carried by the support 31, together with an armature 74. The armature includes a pole piece 75 mounted for rotative movement on transverse end portions 76 of a pair of arms 77, 78, which arms are bent inwardly at 79 and 80, and then upwardly at 81, and provided with a hook at 82. The portions 81 and 82 form a latch. The portions 79 and 80 are passed through openings 83 in the side walls of the support 31, so that said arms, together with the pole piece may move from the dotted line position of Figure 8 to the full line position. As shown in Figure 8, the latch or hook end 82 engages the top of the elevator plate when the pole piece carried by the armature is closed to the magnet, and thus prevents any upward movement of the elevator plate under tension of the springs 71. The latch arm 81 carries a metal strip 84 which has an extended angular lip 85. This lip is so positioned that when the elevator plate is lowered, the lip will strike the undersurface of said elevator plate and move the hook or latch end into engagement with the top surface of the elevator plate. After the electromagnet is energized, the pole piece will be held thereto, and the latch will, therefore, hold the elevator against upward movement.

I may mount upon the top surface of hood 67 a socket 86 which carries an incandescent bulb 87. A flasher button may be interposed between the contacts of the bulb and of the socket.

The front wall of the casing has an area 88 which is cut away to receive a transluscent card which may serve to advertise the product to be dispensed by the broiler.

The electrical circuits are shown diagrammatically in Figure 8 and wires 89 and 90 lead to a source of current supply, the wire 89 being secured to one end of the binding post 66 of the spring contact plate, while a wire 91 leads from the other post to the electromagnet 73. The line 90 from the source of current supply leads to the winding of the magnet 73. Leads 92 and 93 from the socket 86 are connected with the source of electrical supply. In this connection, I provide an insulation block 94, Figure 2, which may be mounted on the external surface of the hood 67, this block carrying a series of posts which interconnect the various leads with a lead corresponding to leads 89 and 90.

The operation, uses and advantages of the invention, are as follows:

Assuming that the chassis for the broiler is secured to and within the casing 1, the magazines are passed through each opening 6 in the front of the casing, each opening corresponding to the general configuration of the front flange of the magazine. The magazine, prior to its insertion within the casing, will have the tine supporting plate with the tine members and guard plate passed through the slots 15, 16 and 18, so as to be positioned within the magazine. Upon depressing each arm 57, the rabbeted sides of the tine support plate is received between and rests upon the inwardly bent portions 42 and 43 of the elevator plate. This brings the angular ends 21 of the tine members into contact with the spring contacts 62 carried by the insulated plate 61. Each arm 57 may then be released, the springs 71 raising the arm, and likewise lifting the elevator and the tine member with its associated tines and guard plate to the position shown in the left hand end of Figure 3. If leads 89 and 90 are in circuit with a source of electricity, the electrical bulb 87 will blink on and off, and when a bun has interposed between halves thereof, a frankfurter, a lowering of arm 57, will force the tines through the bun and the frankfurter. Also, downward movement of the elevator will cause a swinging motion of the arms 77 and 78 due to the extended lip 85 engaging the undersurface of the elevator and to move the latch into engagement with the top surface of the elevator. As electricity is flowing, the magnet is energized and will hold the pole piece 75 thereto. As a consequence, the elevator is not permitted to rise, as long as the pole piece is held by the magnet.

If I make the assumption that the pole piece of the armature will be released when electrical current flow to the magnet is reduced to a certain amount, say between 40 and 50 watts, then it is evident that when the tines penetrate the frankfurter, electricity will flow between the two tines through the frankfurter. This flow may be comparatively high, perhaps 150 watts, with the result that the pole piece is held to the magnet. As the frankfurter cooks, resistance to flow of electricity through the frankfurter will gradually increase, with the result that the wattage will drop, and when it drops to a predetermined point, say 40 to 50 watts, the pole piece is no longer held to the magnet, with the result that it drops away and the springs 71 will elevate the elevator plate and its associated elements. Such movement will expose the magazines so that the bun may be removed therefrom in a cooked condition.

It is evident that regardless of the temperature of the frankfurter, whether it be frozen or at room temperature, when placed in a magazine, it is always properly cooked, because the timer will not release until the flow of electricity drops to a selected amount. This, for the reason, that the moisture content of the frankfurter controls operation of the timer. If the frankfurter is frozen, then the timer will remain closed until the moisture content of the frankfurter is reduced to a certain amount. Multiple tines are used, in the present instance three, for each front and rear member, because it has been found that arcing is prevented if the food article is not centered in the magazine. Furthermore, multiple tines assure proper electrical contact with the food article, which, if not maintained, might result in tine release.

It is obvious that during a cooking operation of the food article, the hands or fingers are not permitted access within the magazine, due to the presence of the guard plate. After the food article has been properly cooked, the magazine, tine members and guard plate, together with the support plate therefor, may be removed from the elevator by again depressing the lever 57. The tine members are readily detachable from the support plate whereby said tine members may be sterilized or washed, and the magazine may likewise be cleaned. The conical form of the magazine assures that material may be readily removed therefrom.

As previously pointed out, the use of the interconnected pairs of levers assures a straight up and down movement of the elevator and its associated elements, a feature of importance over so-called swing levers, as the chassis and associated elements carried thereby may be reduced in size. Furthermore, the slots 15, 16 and 18 are reduced to a size sufficient to just accommodate the tine members and the front guard.

I claim:

1. A broiler including a magazine of elongated form and open at one end, said magazine provided with three spaced-apart slots, one of which is adjacent the open end of the magazine, a dielectric plate adapted to overlie the magazine, said plate formed with a pair of transverse slots and provided with an end plate, spits passed through the slots in said dielectric plate and depending therefrom, an elevating mechanism provided with a plate, having a channel portion, said dielectric plate being slidably carried within said channel portion, a second dielectric plate fixedly carried by said elevating mechanism, said second dielectric plate provided with a pair of electrical contacts for engagement with the spits carried by the first dielectric plate, said elevating mechanism, when lowered, moving the spits through two of the spaced slots in the magazine, the said end plate passing through the slot adjacent the open end of said magazine to close the same.

2. A broiler, including: a casing formed with an opening, a magazine passed through said opening for reception and removal from said casing and adapted to receive and enclose a food article, a channel plate positioned over said magazine, means carried by the casing for raising and lowering the channel plate; electrical contacts, adapted to be in circuit with a source of electricity, carried by the channel plate; a dielectric plate slidably carried by the channel plate to permit removal of said plate therefrom, spits depending from the dielectric plate and in engagement with the electrical contacts, said spits being received within the magazine for food penetration when the channel plate is lowered; and when so lowered, said magazine, spits and dielectric plate being bodily removable through the opening in said casing.

EDWARD P. TYLER.

References Cited in the file of this patent

UNITED STATES PATENTS

| Number | Name | Date |
| --- | --- | --- |
| 2,012,840 | Voeller | Aug. 27, 1935 |
| 2,042,595 | Graham | June 2, 1936 |
| 2,152,208 | Nelson | Mar. 28, 1939 |
| 2,387,586 | Humphreys | Oct. 23, 1945 |
| 2,390,277 | Simplins | Dec. 4, 1945 |
| 2,474,390 | Aff | June 28, 1949 |